United States Patent
Rembe et al.

(10) Patent No.: US 7,079,227 B2
(45) Date of Patent: Jul. 18, 2006

(54) OPTICAL ASSEMBLY TO BE MOUNTED ON A MICROSCOPE FOR MEASURING PERIODIC MOVEMENTS OF A MICROSTRUCTURE

(75) Inventors: Christian Rembe, Waldbronn (DE); Alexander Dräbenstedt, Waldbronn (DE)

(73) Assignee: Polytec GmbH, Waldbronn (DE)

( * ) Notice: Subject to any disclaimer, the term of this patent is extended or adjusted under 35 U.S.C. 154(b) by 189 days.

(21) Appl. No.: 10/766,463

(22) Filed: Jan. 28, 2004

(65) Prior Publication Data
US 2004/0196448 A1 Oct. 7, 2004

(30) Foreign Application Priority Data
Jan. 28, 2003 (EP) ................... 03001803

(51) Int. Cl.
*G01P 3/40* (2006.01)
(52) U.S. Cl. ...................................... 356/23
(58) Field of Classification Search ............ 356/23–26
See application file for complete search history.

(56) References Cited

U.S. PATENT DOCUMENTS

| 6,084,672 | A | * | 7/2000 | Lewin | .......... | 356/496 |
| 6,157,484 | A | * | 12/2000 | Nishida | .......... | 359/434 |
| 6,181,431 | B1 | | 1/2001 | Siu | | |
| 6,404,545 | B1 | | 6/2002 | Ishiwata | | |
| 6,859,282 | B1 | * | 2/2005 | Weber et al. | .......... | 356/446 |
| 2002/0089740 | A1 | | 7/2002 | Wetzel et al. | | |

FOREIGN PATENT DOCUMENTS

| JP | 61-013233 | 1/1986 |
| WO | WO 00/33727 | 6/2000 |

OTHER PUBLICATIONS

Smith, W.J., "Modern Optical Engineering The Design of Optical Systems" 1966, McGraw-Hill Company, New York, XP-002244415, pp. 212-213.*
Q. S. Davis et al., "Using a Light Microscope to Measure Motions with Nanometer Accuracy", Optical Engineering, vol. 37, 1998, pp. 1299-1304.

(Continued)

*Primary Examiner*—Hwa (Andrew) Lee
*Assistant Examiner*—Kara Geisel
(74) *Attorney, Agent, or Firm*—Volpe and Koenig, P.C

(57) ABSTRACT

An optical assembly to be mounted on a microscope for measuring micro-structures is provided, which images a first object image (7) onto a second object image (8) lying above the optical assembly and in this way shifts the object image at a standardized interface for a camera (12), as well as the interface for the camera itself, upwards. The optical assembly permits a stroboscope lamp (6) to be coupled into the incident beam path of the microscope over a beam splitter (5) without requiring any structural modifications to the microscope. Instead, the optical assembly according to the invention is simply mounted on the C-mount of the microscope. The invention enables the use of stroboscope lamps in commercially available microscopes, which otherwise are not suitable for stroboscopic examinations.

7 Claims, 4 Drawing Sheets

OTHER PUBLICATIONS

N. F. Smith et al., "Non-Destructive Resonant Frequency Measurements on MEMS Actuators", Proc. of IEEE 01CH37167, 39th Annual Internat'l Reliability Physics Symposium, Orlando, FL 2001, pp. 99-105.

Microscope Scanning Vibrometer MSV 300, Polytec Hardware Manual for Scanner Controller MSV-Z-040, Microscope Adapter OFV-074 and Scanner Unit OFV-073, Polytec GmbH, Waldbronn, Germany 2002.

* cited by examiner

OPTICAL ASSEMBLY TO BE MOUNTED ON A MICROSCOPE FOR MEASURING PERIODIC MOVEMENTS OF A MICROSTRUCTURE

The invention relates to an optical assembly to be mounted on a microscope for measuring periodic movements of a microstructure.

In particular, miniaturized components in microsystem technology require special measurement systems if the movements and degrees of freedom of the individual elements of the microsystem are to be examined and measured. For the most part, a microscope and an electronic camera are indispensable for this purpose.

For component movements and degrees of freedom perpendicular to the object plane of the microscope, the interferometric measurement method using a scanning vibrometer has proven to be advantageous. Corresponding to the wave-lengths of the light used in this method, very small movements of the miniaturized components can be measured.

Movements of the components in the object plane of the microscope, such as the rotation of a micro-gear, require a different measurement method. For this purpose, typically a microscope with a mounted, electronic camera is used, which produces a series of images representing the movement so that the movement can be evaluated electronically. However, the special problem for microstructures is that the movements of the components are generally much quicker (at frequencies up to 100 MHz) than the smallest time window needed by the camera in order to be able to record an image. To solve this problem, a special microscope is used, which is provided with a stroboscope lamp. The stroboscope lamp transmits light pulses at a pulse frequency that corresponds to an excitation frequency, which simultaneously excites the component to be measured into periodic movements. Every light pulse of the stroboscope lamp thus always strikes the component at the same phase position of the periodic movement, so that the electronic camera records an image, which corresponds to a stroboscope pulse, but which is actually combined from several integrated stroboscope pulses. Through an opposite shift of the phase position of the stroboscope pulses and the excitation frequency for the movement of the component to be measured, the next image of the movement sequence can then be recorded by the electronic camera. As a result, this produces image data that represents the movement sequence of the component to be measured.

While scanning vibrometers are already available, which can be mounted on the standardized camera mount (C-mount) of a commercially available microscope and which thus enable the measurement of movements of the micro-structures perpendicular to the object plane in a very simple way, for stroboscopic measurement of the movements of the component in the object plane, a special microscope with a stroboscopic lamp is needed.

SUMMARY OF THE INVENTION

For the most part, microscopes are already available in appropriate laboratories. The invention is based on the object of enabling stroboscopic detection of the movement of microstructures in the object plane of the microscope used for measurement without the use of a specially configured microscope and without requiring modifications to a standard microscope.

This object is realized by an optical assembly which includes a lower field lens and an upper field lens, with an imaging lens system arranged between the two field lenses in their beam path. A beam splitter is arranged between the two field lenses for coupling light pulses of a stroboscope lamp into the beam path. The optical assembly in the region of the lower field lens is adapted to be mounted on a camera mount of the microscope. The field lens and the imaging lens system are dimensioned and arranged so that the first object image at the camera mount of the microscope is imaged from below the lower field lens to above the upper field lens onto a second object image, and the optical assembly in the region of the upper field lens is configured correspondingly for the mounting of a camera or the like to the camera mount of the microscope.

Advantageous refinements of the optical assembly according to the invention are set forth in the Claims.

The invention thus provides an optical assembly, which can be mounted on the camera mount of the microscope and which has, in turn, a correspondingly formed camera mount on the other side. Simultaneously, this optical assembly includes a lower field lens and an upper field lens, as well as an imaging lens system arranged between these two field lenses. These optical components are dimensioned and arranged so that the first object image at the camera mount of the microscope is imaged from below the lower field lens at the imaging scale of 1:1 onto a second object image above the upper field lens and thus at the upper mount for a camera. Therefore, the optical assembly according to the invention is a kind of intermediate piece, which can very simply shift the object image to be recorded by an electronic camera farther upwards.

At the same time, and this produces the great advantage of the invention relative to previous, typically specially configured microscopes, the optical assembly according to the invention includes in its beam path between the two field lenses a beam splitter for coupling light pulses of a stroboscope lamp. Based on the invention, it is also possible for the first time to perform stroboscopic measurements for detecting microstructure movements with a commercially available, standardized microscope without special modifications to this microscope. This is because in all cases, such microscopes are provided with a standardized C-mount for mounting a camera. The adapter according to the invention thus shifts the interface for attaching an electronic camera upwards and enables light pulses of a stroboscopic lamp to be coupled in the stretch of the beam path obtained in this way without requiring any modifications to the microscope itself. Nevertheless, the full functionality of the microscope is given, because a (standardized) camera mount is also provided after the mounting of the optical assembly according to the invention and can be used both for an electronic camera and also for a scanning vibrometer or the like.

Special advantages result when the field lenses and the imaging lens system are dimensioned and arranged so that the individual rays of the beam from each image point of the first object image emerge from the second object image imaged above the upper field lens at the same angles as from the first object image. This enables a cascade arrangement for the system and two or even more optical assemblies according to the invention can be connected one after the other. However, even without this cascade arrangement, such a refinement of the invention is advantageous because all other devices, which likewise couple light into the beam path, can be used with the same alignments as if they were mounted directly on the microscope.

Preferably, the beam splitter provided in the optical assembly according to the invention is dimensioned and arranged so that the light pulses of the stroboscope lamp are coupled into the incident beam path of the microscope according to the rules of Köhler illumination. According to these rules of illumination, the individual beams diverging from one point of the light source are always incident on the object plane in parallel, so that a very uniform illumination of the object field itself is produced if the light source emits non-uniformly in the plane.

Preferably, the stroboscope lamp itself is part of the optical assembly. This then produces a fixed spatial arrangement of the stroboscope lamp relative to the beam splitter. Thus there is no need for any alignment for coupling the stroboscope light via the beam splitter into the incident beam path of the microscope.

The stroboscope lamp is preferably an LED with an aperture angle $\theta$ and with a phosphor surface of a diameter d. The aperture angle and the diameter of the phosphor surface satisfy the relationship: $d*\theta<0.5$, where d is in mm and $\theta$ is in rad. More preferably, the LED has an optical output of more than 10 mW. These initial conditions have proven to be optimal in achieving the results according to the invention.

The imaging lens system is preferably a combination system, which guarantees aberration-free imaging. Such lens systems are known.

Preferably, the optical assembly according to the invention is configured so that the first object image is imaged on the second object image without vignetting. This guarantees maximum light efficiency, imaging sharpness, and ability to form a cascade arrangement.

The solution principle according to the invention is further embodied in a modular system for measuring periodic movements of a microstructure, which has, in addition to a microscope, which is provided with a standardized camera mount, also a stroboscope lamp, an electronic camera, and a scanning vibrometer, while an optical assembly is also provided according to the invention as described above. The optical assembly can then be mounted on the camera mount of the microscope instead of the camera. Alternatively, the scanning vibrometer can be mounted on the camera mount of the microscope, while, however, it is also possible to mount the scanning vibrometer on the optical assembly. Accordingly, the electronic camera can be mounted on the camera mount of the microscope, on the optical assembly, or on the scanning vibrometer. It is understood that for this modular system, more synchronization electronics and an evaluation computer must be provided in order to be able to execute and evaluate the stroboscopic examination.

BRIEF DESCRIPTION OF THE DRAWINGS

One embodiment of the invention is described and explained in more detail in the following with reference to the enclosed drawings. Shown are.

DETAILED DESCRIPTION OF THE PREFERRED EMBODIMENTS

Figure 1:
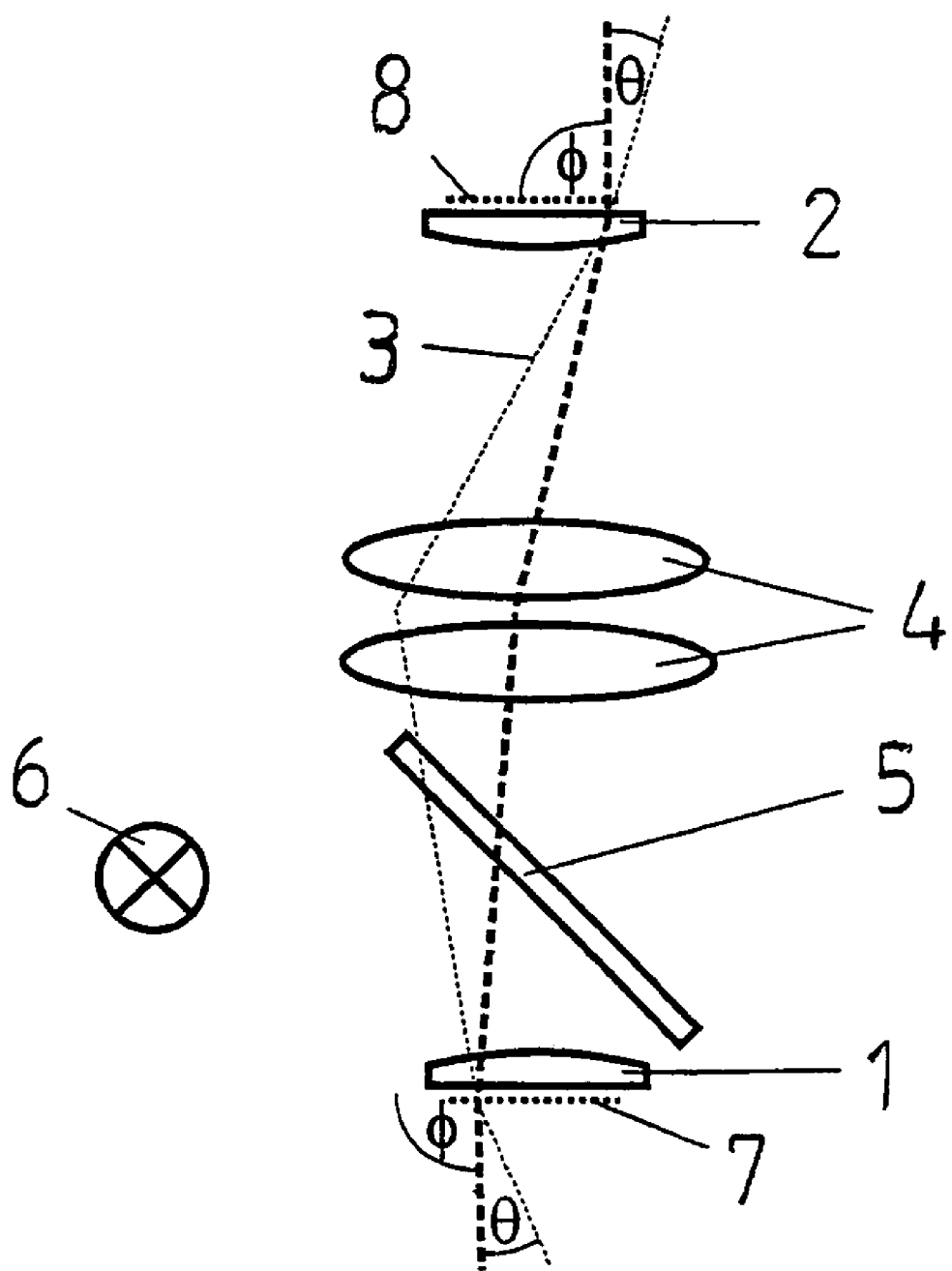
FIG. 1 is a schematic representation of an example for an optical assembly according to the invention.

FIG. 1 shows the principle configuration of an optical assembly according to the invention, including a lower field lens 1, an upper field lens 2, an imaging lens system 4 in the beam path 3 of these lenses, and a beam splitter 5 for coupling the light pulses of a stroboscope lamp 6 into the microscope beam path. As shown by FIG. 1, a first object image 7 is imaged above the upper field lens 2 on a second object image 8 by the optical assembly according to the invention. The exceptional feature of the embodiment described here is that the individual rays of the beam from each image point of the first object image 7 emerge from the second object image 8 at the same angles $\theta$, $\phi$ as from the first object image 7 itself. According to this embodiment, the imaging lens system 4 is an aberration-corrected lens system for 1:1 imaging.

Figure 2:
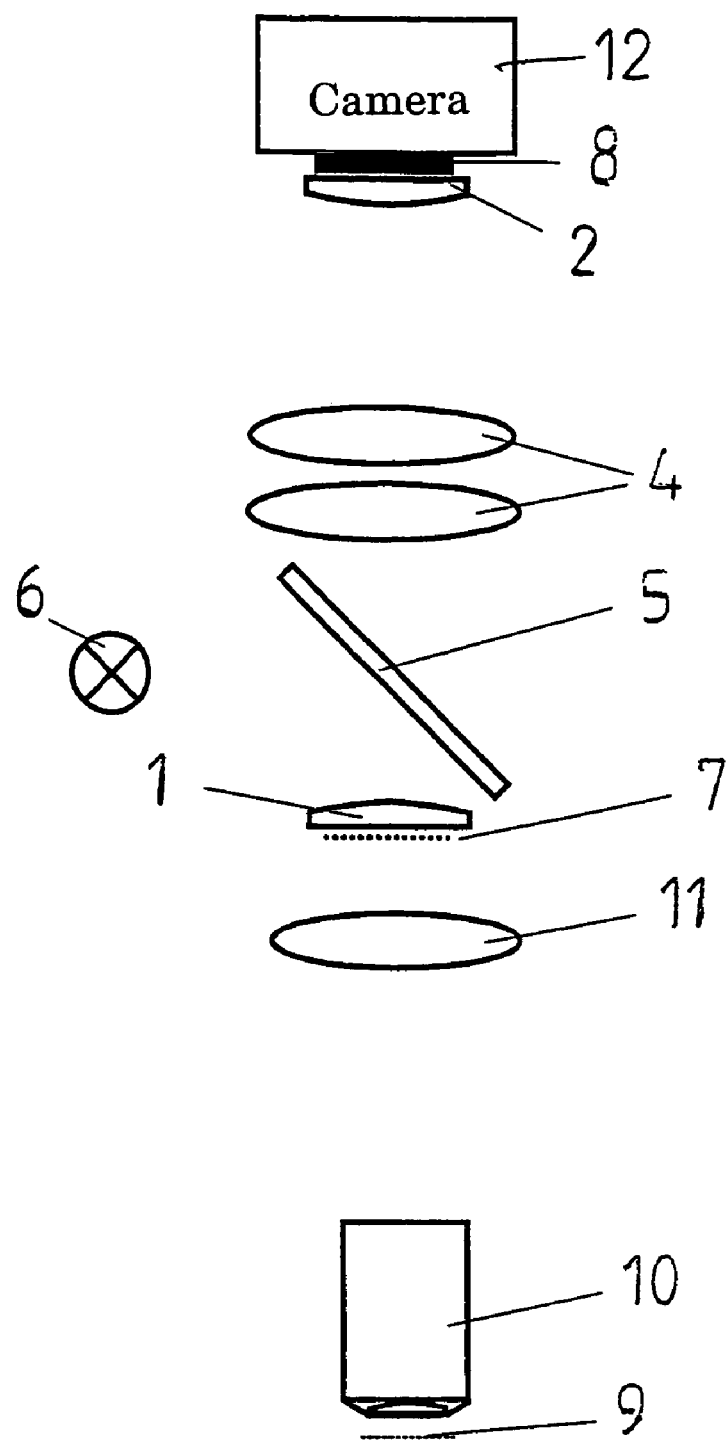
FIG. 2 is a schematic representation of an example for a complete measurement system with optical assembly according to the invention.

In a similar schematic representation, FIG. 2 shows how the optical assembly according to the invention interacts with the other components of the measurement device. In the region of the lower field lens 1, the first object image 7 is indicated, which represents an object 9 through a microscope objective 10 and a tube lens 11 of the microscope. Now, the optical assembly according to the invention, consisting of the lower field lens 1, the upper field lens 2, the imaging lens system 4, and also the beam splitter 5, and a fixed, installed stroboscope lamp 6, "shifts" the first object image 7 into a higher plane at the second object image 8 above the upper field lens 2. This second object image 8 is detected by an electronic camera 12 on a standardized mount (C-mount) and thus can be evaluated electronically.

Figure 3:
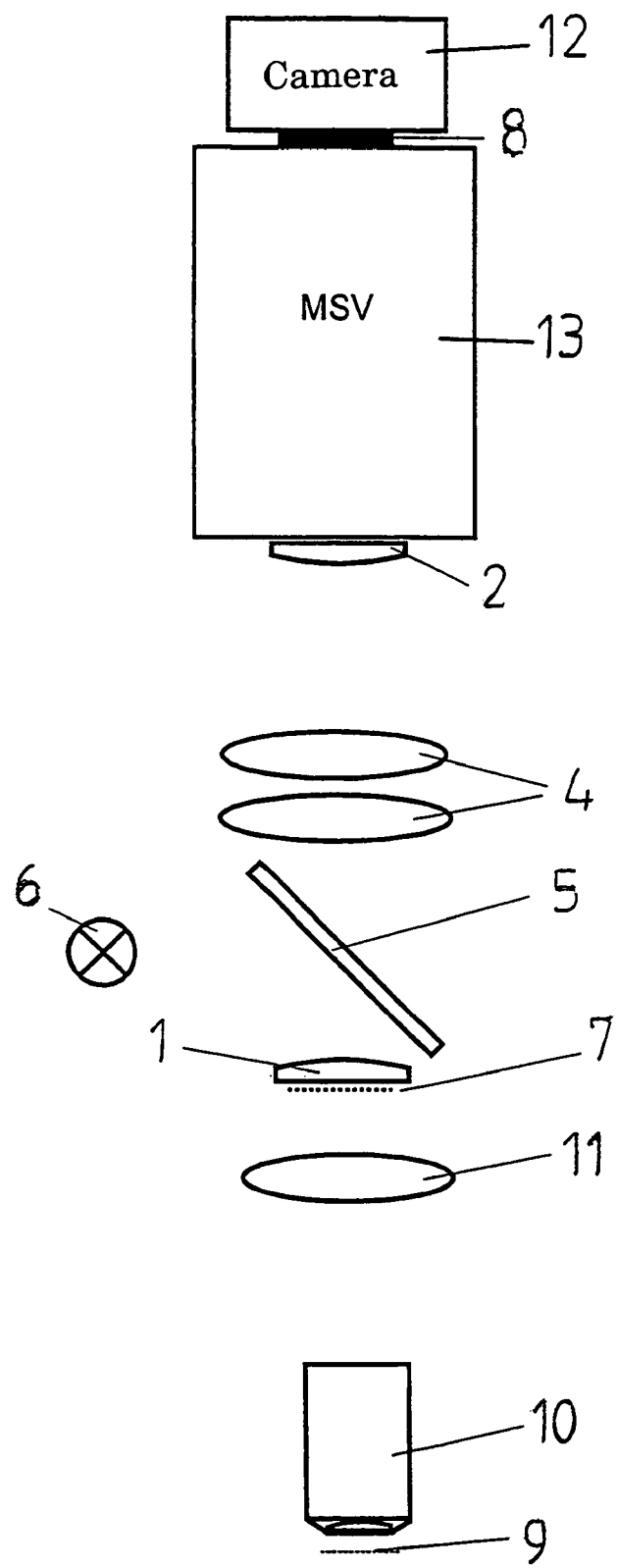
FIG. 3 is a schematic representation of an example for a modular system according to the invention.

FIG. 3 shows a modular system with the described optical assembly according to the invention, with a lower field lens 1, an upper field lens 2, an imaging lens system 4, a beam splitter 5, and a stroboscope lamp 6. The commercially available microscope, here just the microscope objective 10 and the tube lens 11 are illustrated, images the object 9 on the first object image 7. Also, the camera mount position above the upper field lens 2, on which a second object image is now projected by the invention, is provided with a standardized camera mount, so that here a scanning vibrometer 13 and then on this device an electronic camera 12 are mounted.

Figure 4:
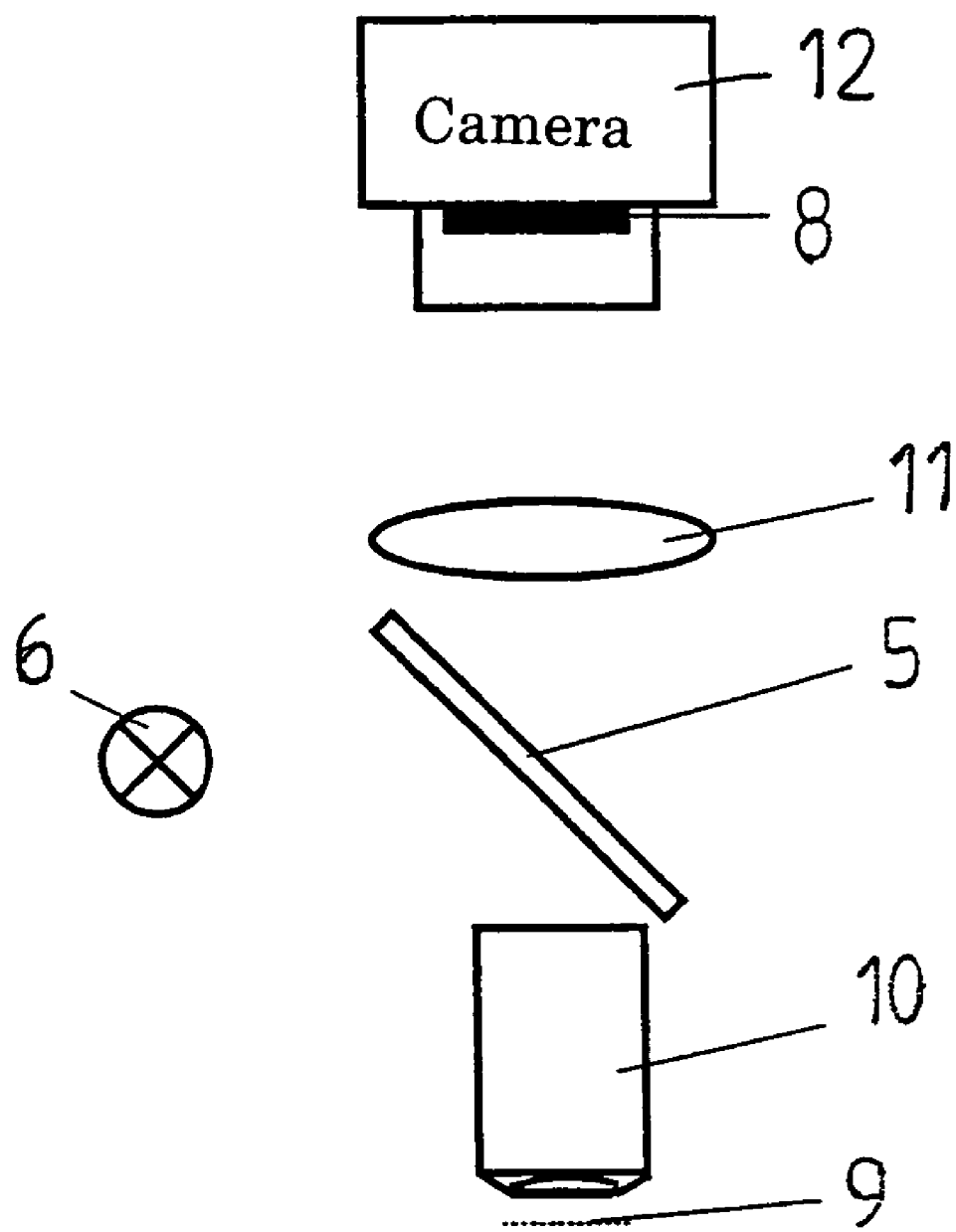
FIG. 4 is a schematic representation of the state of the art.

Finally, FIG. 4 shows a configuration according to the state of the art. Here, it can be seen clearly that the light of the stroboscope lamp 6 is coupled between the microscope objective 10 and the tube lens 11 by means of a beam splitter 5. This requires a fixed alignment and attachment of the stroboscope lamp 6 to the microscope, which is an expensive, special processing step, because the illumination mounts are specific to the manufacturer.

LIST OF REFERENCE NUMBERS

1 Field lens (lower)
2 Field lens (upper)
3 Beam path
4 Imaging lens system
5 Beam splitter
6 Stroboscope lamp
7 Object image (first)
8 Object image (second)
9 Object
10 Microscope objective
11 Tube lens
12 Camera 13 Scanning vibrometer

The invention claimed is:

1. Optical assembly to be mounted on a microscope for measuring periodic movements of a microstructure, comprising:
   a lower field lens (1) and an upper field lens (2);
   an imaging lens system (4) arranged between the two field lenses (1, 2) in a beam path (3) thereof;
   a stroboscope lamp (6) including an LED with an aperture angle θ and with a phosphor surface having a diameter d, which satisfies the relation: d*θ<0.5, wherein d is in mm and θ is in rad;
   a beam splitter (5) arranged between the two field lenses (1, 2) for coupling light pulses of the stroboscope lamp (6) into the beam path (3);
   wherein the optical assembly in the region of the lower field lens (1) is adapted to be mounted on a camera mount of the microscope; and
   wherein the field lenses (1, 2) and the imaging lens system (4) are dimensioned and arranged so that the first object image (7) at the camera mount of the microscope is imaged from below the lower field lens (1) to above the upper field lens (2) onto a second object image (8); and
   wherein the optical assembly in the region of the upper field lens (2) is configured for mounting a camera (12) to the camera mount of the microscope.

2. Optical assembly according to claim 1, wherein the field lenses (1, 2) and the imaging lens system (4) are dimensioned and arranged so that individual rays of the beam from each image point of the first object image (7) emerge from the second object image (8) imaged above the upper field lens (2) at the same angles as from the first object image (7).

3. Optical assembly according to claim 1, wherein the beam splitter (5) is dimensioned and arranged so that the light pulses of the stroboscope lamp (6) are coupled in the incident beam path of the microscope according to the rules of Köhler illumination.

4. Optical assembly according to claim 1, wherein the LED has an optical output of more than 10 mW.

5. Optical assembly according to claim 1, wherein the imaging lens system (4) is configured for aberration-free imaging.

6. Optical assembly according to claim 1, wherein the field lenses (1, 2) of the imaging lens system (4) are dimensioned and arranged so that the first object image (7) is imaged on the second object image (8) without vignetting.

7. Modular system for measuring periodic movements of a microstructure, comprising:
   a microscope, which is provided with a standardized camera mount;
   an optical assembly comprising:
      a lower field lens (1) and an upper field lens (2);
      an imaging lens system (4) arranged between the two field lenses (1, 2) in a beam oath (3) thereof;
      a stroboscope lame (6) including an LED with an aperture angle θ and with a phosphor surface having a diameter d, which satisfies the relation: d*θ<0.5, wherein d is in mm and θ is in rad;
      a beam splitter (5) arranged between the two field lenses (1, 2) for coupling light pulses of the stroboscope lamp (6) into the beam path (3);
      wherein the optical assembly in the region of the lower field lens (1) is mounted on the camera mount of the microscope; and
      wherein the field lens (1, 2) and the imaging lens system (4) are dimensioned and arranged so that the first object image (7) at the camera mount of the microscope is imaged from below the lower field lens (1) to above the upper field lens (2) onto a second object image (8); and
   a scanning vibrometer (13) mounted on the camera mount of the microscope or on the optical assembly;
   wherein an electronic camera (12) is mounted on the camera mount of the microscope, on the optical assembly, or on the scanning vibrometer (13).

* * * * *